(12) United States Patent
Shin et al.

(10) Patent No.: US 8,509,314 B2
(45) Date of Patent: Aug. 13, 2013

(54) METHOD AND APPARATUS FOR SPATIAL ERROR CONCEALMENT OF IMAGE

(75) Inventors: Seung-Woo Shin, Yongin-si (KR); Se-an Kwon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1112 days.

(21) Appl. No.: 12/050,305

(22) Filed: Mar. 18, 2008

(65) Prior Publication Data

US 2008/0317137 A1   Dec. 25, 2008

(30) Foreign Application Priority Data

Jun. 19, 2007 (KR) .................. 10-2007-0060061

(51) Int. Cl.
*H04N 7/26* (2006.01)

(52) U.S. Cl.
USPC ........... 375/240.27; 375/E7.279; 375/240.12; 375/E7.135

(58) Field of Classification Search
USPC .............. 375/E7.17, E7.135, E7.279, 240.12; 382/256, 260, 232
See application file for complete search history.

(56) References Cited

U.S. PATENT DOCUMENTS

| 5,751,361 | A  | * | 5/1998 | Kim ......................... 375/240.12 |
| 6,744,924 | B1 | * | 6/2004 | Hannuksela et al. ......... 382/232 |
| 7,587,098 | B2 | * | 9/2009 | Kim et al. .................... 382/256 |
| 2004/0190787 | A1 | * | 9/2004 | Nakami ........................ 382/260 |
| 2005/0196053 | A1 | * | 9/2005 | Pore et al. .................... 382/233 |
| 2005/0225564 | A1 | * | 10/2005 | Shan ............................. 345/606 |
| 2006/0051068 | A1 | * | 3/2006 | Gomila ........................ 386/114 |
| 2006/0115184 | A1 | * | 6/2006 | Michel .......................... 382/299 |

FOREIGN PATENT DOCUMENTS

KR    10-2007-0003502      5/2007

OTHER PUBLICATIONS

Korean Office Action dated Jun. 23, 2013 issued in corresponding Korean Application No. 10-2007-0060061.
Hyun sun Yoo et al. "*A Spatial Error Concealment Technique Using Edge-Oriented Interpolation*" dated Mar. 2005, p. 133-140.

* cited by examiner

*Primary Examiner* — Andrew Chriss
*Assistant Examiner* — Mohamed Kamara
(74) *Attorney, Agent, or Firm* — Staas & Halsey LLP

(57) ABSTRACT

A method and apparatus for error concealment in image data including a block having an error, the method including: dividing a region that surrounds the block into a plurality of neighboring regions; separately calculating edge angles of the neighboring regions; and selectively performing directional interpolation based on the calculated edge angles.

21 Claims, 6 Drawing Sheets

METHOD AND APPARATUS FOR SPATIAL ERROR CONCEALMENT OF IMAGE

CROSS-REFERENCE TO RELATED APPLICATION

This application claims the benefit of Korean Application No. 2007-60061, filed on Jun. 19, 2007 in the Korean Intellectual Property Office, the disclosure of which is incorporated herein by reference.

BACKGROUND OF THE INVENTION

1. Field of the Invention

Aspects of the present invention relate to a method and apparatus for spatial error concealment of an image, and more particularly, to a method and apparatus for restoring a block having an error by adaptively performing spatial error concealment according to information on a plurality of neighboring regions of the block.

2. Description of the Related Art

According to image compression standards (such as Moving Picture Experts Group (MPEG)-1, MPEG-2, and MPEG-4 H.264/MPEG-4 Advanced Video Coding (AVC)), an image is encoded by using intra (I) pictures, predictive (P) pictures, and bipredictive (B) pictures.

FIG. 1 illustrates a conventional image sequence. Referring to FIG. 1, I pictures are periodically generated at regular temporal intervals. Each I picture is generated by independently encoding a picture using spatial redundancies of the picture regardless of temporally previous or subsequent pictures. Motion estimation for removing temporal redundancies is not performed and the encoding is performed only by using information of the picture.

A P or B picture is generated by performing inter prediction between pictures. In particular, the P or B picture is generated by performing inter prediction between pictures using an I picture, another P picture, or another B picture as a reference picture, so as to remove the temporal redundancies.

Error concealment includes spatial error concealment and temporal error concealment. If a block having an error (i.e., a missing block) is detected while the P or B picture is being decoded and restored, the missing block is restored by performing the temporal error concealment according to H.264/AVC standards.

However, if the missing block is detected while the I picture is being decoded and restored, the missing block is restored by performing the spatial error concealment. The spatial error concealment includes directional interpolation performed in consideration of an edge angle of the missing block and bilinear interpolation performed without consideration of the edge angle of the missing block.

According to the H.264/AVC standards, only bilinear interpolation is used for the spatial error concealment. The bilinear interpolation will now be described in detail with reference to FIG. 2. FIG. 2 illustrates a conventional method of bilinear interpolation. Referring to FIG. 2, when a missing block 210 is to be restored, each pixel 212 of the missing block 210 is restored by performing the bilinear interpolation. Assuming that a pixel 212 is to be restored, the bilinear interpolation is performed by using pixels 222 and 224 included in neighboring regions in a vertical direction of the missing block 210 and do not have an error, and pixels 226 and 228 included in neighboring regions in a horizontal direction of the missing block 210 and do not have an error.

Furthermore, the bilinear interpolation is performed by setting weights according to respective distances from the pixel 212 to the pixels 222, 224, 226, and 228 of the neighboring regions.

If the missing block 210 is restored by performing the bilinear interpolation according to the H.264/AVC standards as described above, the missing block 210 is linearly interpolated without consideration of edge angles of the neighboring regions. As a result, blocking artifacts may occur. Also, if the missing block 210 is restored only by performing the above-mentioned directional interpolation, unnecessary edges not included in an original block may be included in the restored block.

If the blocking artifacts or the unnecessary edges occur in an I picture, an error is propagated to P or B pictures that refer to the I picture. Thus, a whole image sequence may be seriously distorted.

SUMMARY OF THE INVENTION

Aspects of the present invention provide a method and apparatus for error concealment capable of more accurately restoring a block having an error, and a computer readable recording medium having recorded thereon a computer program for executing the method of error concealment.

According to an aspect of the present invention, there is provided a method of error concealment in image data, the method including: detecting a block having an error from the image data; dividing a region that surrounds the detected block into a plurality of neighboring regions; separately calculating an edge angle for each of the neighboring regions; and restoring the detected block by selectively performing directional interpolation based on the calculated edge angles.

The restoring may include determining whether at least a predetermined number of edge angles from among the calculated edge angles are identical; and performing the directional interpolation if the predetermined number of edge angles are identical.

The performing of the directional interpolation may include performing the directional interpolation by using the identical edge angles.

The restoring may further include performing bilinear interpolation if it is determined that there does not exist the at least predetermined number of identical edge angles from among the calculated edge angles.

The separate calculating of the edge angles may include separately calculating the edge angles of the neighboring regions by using a Sobel or a Prewitt filter.

According to another aspect of the present invention, there is provided an apparatus for error concealment in image data, the apparatus including: an error detection unit to detect a block having an error from a current picture in the image data; an edge detection unit to divide a region that surrounds the detected block into a plurality of neighboring regions and to separately calculate an edge angle for each of the neighboring regions; and an error concealment unit to restore the detected block by selectively performing directional interpolation based on the calculated edge angles.

The error concealment unit may include a determination unit to determine whether at least a predetermined number of edge angles from among the calculated edge angles are identical; and an interpolation unit to perform the directional interpolation if the at least predetermined number of edge angles are identical.

The interpolation unit may perform the directional interpolation by using the identical edge angles.

The interpolation unit may perform bilinear interpolation if it is determined that there does not exist the at least predetermined number of identical edge angles.

The edge detection unit may separately calculate the edge angles of the neighboring regions by using a Sobel or a Prewitt filter.

The neighboring regions may be top, bottom, left, and right neighboring regions of the detected block.

According to another aspect of the present invention, there is provided a computer readable recording medium having recorded thereon a computer program for executing the method of error concealment.

According to yet another aspect of the present invention, there is provided an apparatus for error concealment in image data including a block having an error, the apparatus including: an edge detection unit to divide a region that surrounds the block having the error into a plurality of neighboring regions and to separately calculate an edge angle for each of the neighboring regions; and an error concealment unit to restore the block having the error by selectively performing directional interpolation based on the calculated edge angles.

According to still another aspect of the present invention, there is provided a method of error concealment in image data including a block having an error, the method including: dividing a region that surrounds the block having the error into a plurality of neighboring regions; separately calculating an edge angle for each of the neighboring regions; and restoring the block having the error by selectively performing directional interpolation based on the calculated edge angles.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
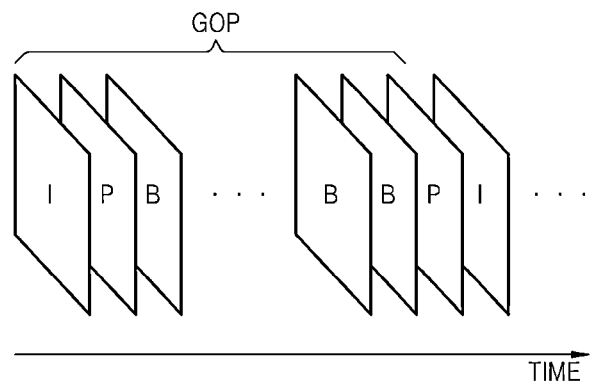
FIG. 1 illustrates a conventional image sequence.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
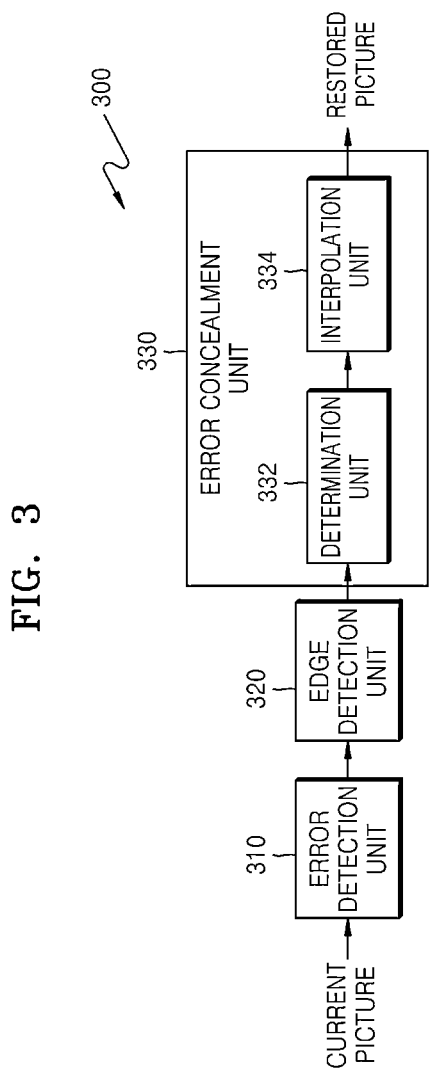
FIG. 3 illustrates an apparatus for error concealment according to an embodiment of the present invention.

FIG. 3 illustrates an apparatus 300 for error concealment according to an embodiment of the present invention. Referring to FIG. 3, the apparatus 300 includes an error detection unit 310, an edge detection unit 320, and an error concealment unit 330. The apparatus 300 restores a block having an error (i.e., a missing block) by performing spatial error concealment.

The error detection unit 310 detects the missing block from a current decoded picture. Image data of the missing block is missing due to an error that has occurred while, for example, the current picture is being transmitted.

In image compression methods according to Moving Picture Experts Group (MPEG)-1, MPEG-2, and MPEG-4H.264/MPEG-4 Advanced Video Coding (AVC) standards, image data is compressed to a high degree. Thus, if the error occurs to a portion of a bitstream including the image data, a large number of blocks may have errors. In particular, if the error occurs to a block included in an intra (I) picture, the error is propagated to predictive (P) or bipredictive (B) pictures that refer to the I picture. As a result, a whole image sequence may be seriously distorted. Accordingly, the error detection unit 310 receives data of the current picture decoded by a decoder, and detects the missing block on which error concealment is to be performed from the received data.

The edge detection unit 320 divides a region that surrounds the missing block into a plurality of neighboring regions, and separately calculates edge angles of the neighboring regions. The missing block and the neighboring regions may have similar edge angles. Accordingly, the edge angles of the neighboring regions are calculated in order to restore the missing block by performing interpolation according to the edge angles of the neighboring regions. However, an edge angle of the missing block is not always the same as the edge angles of the neighboring regions. In this case, if directional interpolation is performed on the missing block by using the edge angles of the neighboring regions, unnecessary edges are included in a restored block causing serious distortion (as in the conventional method described with reference to FIG. 2).

In general, when the edge angles of the neighboring regions are different from each other, the edge angle of the missing block may be different from the edge angles of the neighboring regions. For example, when the edge angles of top, bottom, left, and right neighboring regions of the missing block are all different from each other, the unnecessary edges may be generated, causing serious distortion if the directional interpolation is performed on the missing block by using one of the edge angles having the greatest strength.

Therefore, aspects of the present invention divide a region that surrounds a missing block into a plurality of neighboring regions, separately calculate edge angles of the neighboring regions, and determine whether to perform directional interpolation by comparing the calculated edge angles. An edge detection method will now be described in detail with reference to FIGS. 4A through 4D.

FIGS. 4A through 4D illustrate an edge detection method according to an embodiment of the present invention. In particular, FIGS. 4A through 4D illustrate a method of dividing a region that surrounds a missing block 410 into top, bottom, left, and right neighboring regions and separately calculating edge angles of the neighboring regions by the edge detection unit 320 (illustrated in FIG. 3).

Figure 4A:
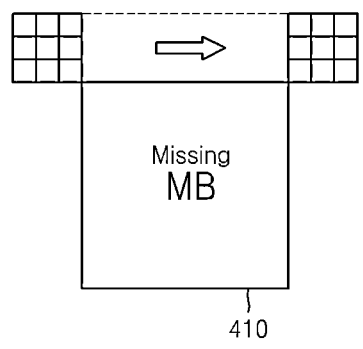
FIGS. 4A through 4D illustrate an edge detection method according to an embodiment of the present invention.
Figure 4B:
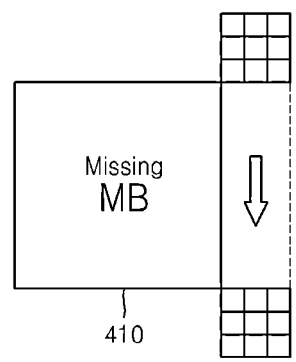
Figure 4C:
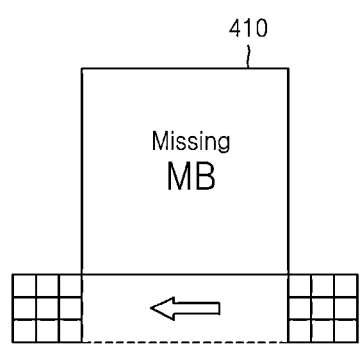
Figure 4D:
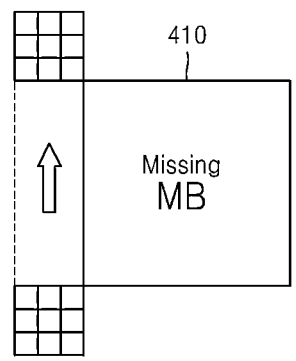

Referring to FIG. 4A, an edge angle of the top neighboring region is calculated. The top neighboring region may be scanned by using a 3×3 Sobel or a 3×3 Prewitt filter. As a result of the scanning, an angle and strength of an edge of the top neighboring region are calculated. Referring to FIG. 4B, an edge angle of the right neighboring region is calculated. As described with reference to FIG. 4A, an angle and strength of an edge of the right neighboring region are calculated by scanning the right neighboring region using, for example, the 3×3 Sobel or the 3×3 Prewitt filter. Referring to FIGS. 4C and 4D, edge angles of the bottom and left neighboring regions are respectively calculated in the same manner as described with reference to FIGS. 4A and 4B.

Figure 5:
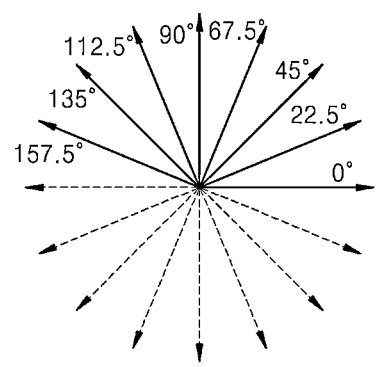
FIG. 5 illustrates examples of edge angles, according to an embodiment of the present invention.

In order to properly compare the calculated edge angles, the calculated edge angles may be quantized. A method of quantizing the calculated edge angles will now be described in detail with reference to FIG. 5. FIG. 5 illustrates examples of edge angles according to an embodiment of the present invention. Referring to FIG. 5, the edge detection unit 320 illustrated in FIG. 3 separately calculates edge angles of a plurality of neighboring regions and quantizes the calculated edge angles.

Each of the calculated edge angles may be quantized by using the closest angle from among the examples of edge angles illustrated in FIG. 5. For example, if the edge angle of the top neighboring region (calculated as described with reference to FIG. 4A) is 22°, the edge angle of the top neighboring region is quantized by using 22.5°, that is, the closest angle to 22° from among the examples of edge angles. Similarly, a calculated edge angle of 3° is quantized by using 0°. The calculated edge angles are quantized in order to easily compare the edge angles of the neighboring regions by using the quantized edge angles.

The eight edge angles illustrated in FIG. 5 are merely examples of edge angles. It is obvious to those of ordinary skill in the pertinent art that any other examples of edge angles can be used for the quantizing. For example, sixteen examples of edge angles at intervals of 11.25° may also be used.

Referring to FIG. 3, when the edge angles of the neighboring regions are completely calculated by the edge detection unit 320, the error concealment unit 330 selectively performs the directional interpolation based on the calculated edge angles. Specifically, the edge angles calculated and quantized by the edge detection unit 320 are compared so as to determine whether the edge angles are identical, and the directional interpolation is selectively performed based on the result of determination.

The error concealment unit 330 includes a determination unit 332 and an interpolation unit 334. The determination unit 332 determines whether to perform the directional interpolation based on the edge angles of the neighboring regions that are calculated by the edge detection unit 320. In particular, the determination unit 332 determines whether to perform the directional interpolation by determining whether at least a predetermined number of edge angles from among the edge angles calculated and quantized by the edge detection unit 320 are identical.

According to aspects of the present invention, if at least two edge angles from among the calculated edge angles are identical, it is determined that the directional interpolation is to be performed. However, it is understood that according to other aspects, more than two edge angles would have to be identical in order to determine that the directional interpolation is to be performed. If there are no identical edge angles from among the calculated edge angles, it is determined that a different interpolation method other than the directional interpolation is to be performed.

Figure 2:
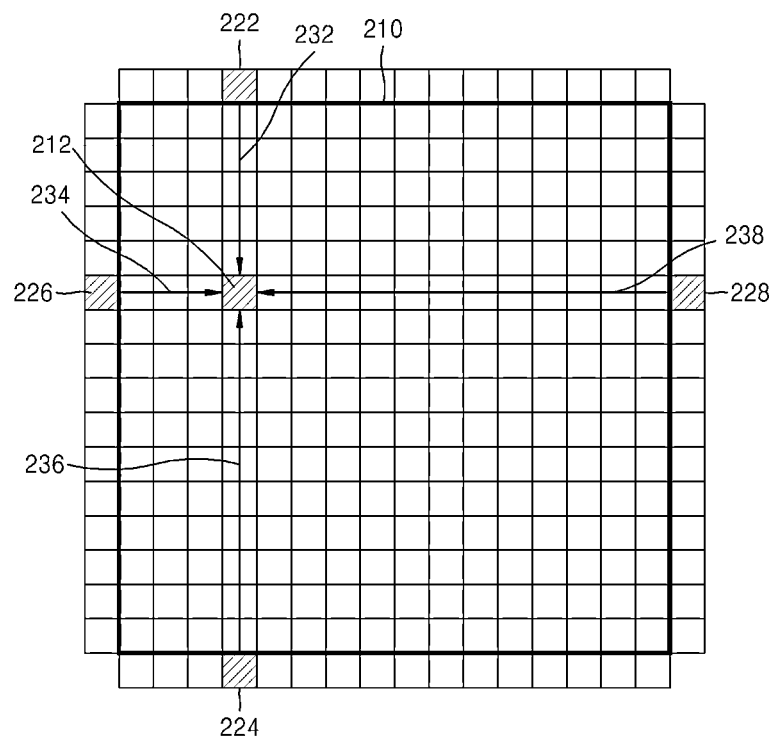
FIG. 2 illustrates a conventional method of bilinear interpolation.

An example of the different interpolation method may be the bilinear interpolation described with reference to FIG. 2. However, it is understood that any other interpolation method may also be performed instead of the bilinear interpolation when the edge angles of the neighboring regions are different from each other.

Figure 6A:
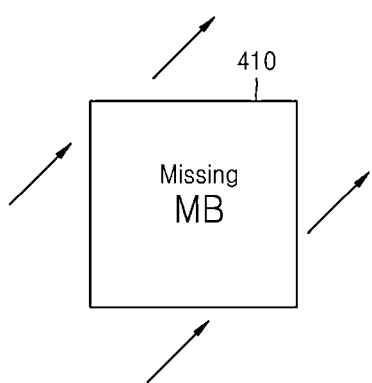
FIGS. 6A and 6B illustrate examples of edge angles in a plurality of neighboring regions of a missing block according to an embodiment of the present invention.
Figure 6B:
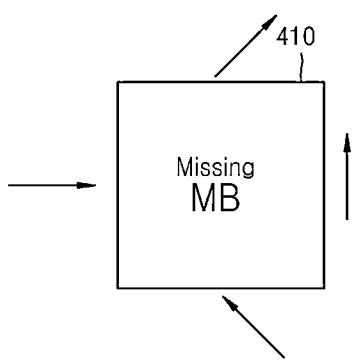

FIGS. 6A and 6B illustrate examples of edge angles in a plurality of neighboring regions of a missing block 410 according to an embodiment of the present invention. Referring to FIG. 6A, at least a predetermined number of edge angles of the neighboring regions are identical. In particular, all the edge angles of the neighboring regions are identical in FIG. 6A. If it is assumed that all the edge angles are 45°, the determination unit 332 illustrated in FIG. 3 determines that directional interpolation should be performed by using the identical edge angle, 45°.

However, referring to FIG. 6B, identical edge angles of the neighboring regions do not exist. Here, the determination unit 332 determines that another interpolation different from the directional interpolation is to be performed. In this case, if the directional interpolation is performed, unnecessary edges are generated. Thus, the missing block 410 can be restored more accurately by performing another interpolation method different from the directional interpolation (such as a bilinear interpolation).

Referring back to FIG. 3, the interpolation unit 334 selectively performs the directional interpolation based on the result of determination of the determination unit 332. If the determination unit 332 determines that at least a predetermined number of edge angles of the neighboring regions are identical, the directional interpolation is performed by using the identical edge angle. However, if the determination unit 332 determines that the identical edge angles do not exist, another interpolation method different to the directional interpolation is performed.

As described above, an example of the other interpolation method may be the bilinear interpolation. However, it is understood that any other interpolation method may also be performed instead of the bilinear interpolation when the edge angles of the neighboring regions are different from each other.

Figure 7:
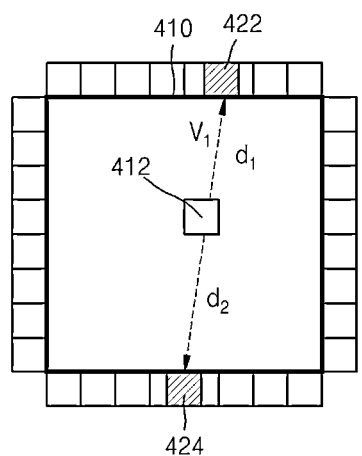
FIG. 7 illustrates a method of directional interpolation according to an embodiment of the present invention.

FIG. 7 illustrates a method of directional interpolation according to an embodiment of the present invention. In particular, FIG. 7 illustrates a method of directional interpolation performed by the interpolation unit 334 (illustrated in FIG. 3) based on the result of determination of the determination unit 332 (illustrated in FIG. 3).

Referring to FIG. 7, when a pixel 412 included in a missing block 410 is to be restored, interpolation is performed in consideration of an edge angle. If the determination unit 332 determines that at least a predetermined number of edge angles of a plurality of neighboring regions have an edge angle value $V_1$, the interpolation is performed by using the edge angle $V_1$. Here, the interpolation is performed by setting weights in consideration of distances $d_1$ and $d_2$ from the pixel 412 that is to be restored to pixels 422 and 424 disposed in the neighboring regions in a direction of the edge angle $V_1$. A pixel value of the pixel 412 that is to be restored is calculated by using Equation 1:

$$f_{res} = \frac{d_1}{d_1 + d_2} \cdot f_1 + \frac{d_2}{d_1 + d_2} \cdot f_2,$$ [Equation 1]

where $f_{res}$ represents the pixel value of the pixel 412 that is to be restored, $d_1$ and $d_2$ respectively represent the distances from the pixel 412 that is to be restored to the pixels 422 and 424 disposed in the neighboring regions in the direction of the edge angle $V_1$, and $f_1$ and $f_2$ respectively represent pixel values of the pixel 422 at the distance $d_1$ and the pixel 424 at the distance $d_2$.

Figure 8:
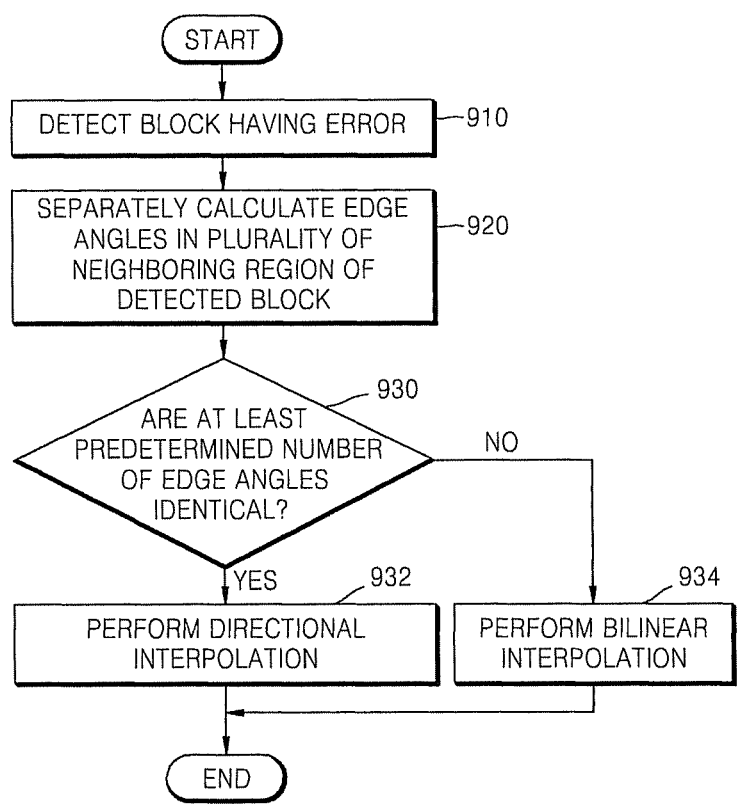
FIG. 8 illustrates a method of error concealment according to an embodiment of the present invention.

FIG. 8 illustrates a method of error concealment according to an embodiment of the present invention. Referring to FIG. 8, in operation 910, a block having an error (i.e., a missing block) is detected.

In operation 920, a region that surrounds the missing block is divided into a plurality of neighboring regions and edge angles of the neighboring regions are separately calculated. For example, the region that surrounds the missing block may be divided into top, bottom, left, and right neighboring regions and edge angles of the top, bottom, left, and right neighboring regions are separately calculated by using a Sobel or a Prewitt filter. Here, the edge angles and the strength of edges are calculated. The edge angles may be quantized by using predetermined quantized angles.

In operations 930, 932, and 934, directional interpolation is selectively performed based on the edge angles calculated in operation 920 in order to restore the missing block detected in operation 910. In particular, in operation 930, it is determined whether at least a predetermined number of edge angles from among the edge angles calculated in operation 920 are identical. For example, it is determined whether at least two edge angles from among the edge angles calculated in operation 920 are identical.

If it is determined that at least a predetermined number of edge angles are identical in operation 930, the directional interpolation is performed on the missing block in operation 932. For example, if it is determined that at least two edge angles are identical, the directional interpolation is performed.

If it is determined that at least a predetermined number of edge angles are not identical in operation 930, bilinear interpolation is performed on the missing block as in the conventional method (described with reference to FIG. 2) in operation 934. For example, if it is determined that no two edge angles are identical in operation 930, the bilinear interpolation is performed. As described above, the bilinear interpolation is merely an example of another interpolation method different to the directional interpolation. It is understood that another interpolation method other than the bilinear interpolation may be used.

Aspects of the present invention can also be implemented as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion.

As described above, according to aspects of the present invention, a block having an error may be restored more accurately by selectively performing directional interpolation based on edge angles in a plurality of neighboring regions of the block. Furthermore, when a block having an error is restored, blocking artifacts may be minimized by determining whether to perform directional interpolation based on edge angles in a plurality of neighboring regions of the block.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of error concealment in image data, the method comprising:
   detecting a block having an error from a current picture in the image data;
   dividing a region that surrounds the detected block into a plurality of neighboring regions;
   separately obtaining an edge angle for each of the neighboring regions; and
   restoring the detected block by selectively performing directional interpolation in a direction of the obtained edge angles,
   wherein the restoring comprises determining whether at least a predetermined number of edge angles from among the obtained edge angles are identical and performing the directional interpolation if the at least predetermined number of edge angles are identical.

2. The method as claimed in claim 1, wherein the predetermined number is two.

3. The method as claimed in claim 1, wherein the performing of the directional interpolation comprises performing the directional interpolation by using the identical edge angles.

4. The method as claimed in claim 1, wherein the restoring further comprises:
   performing bilinear interpolation if determined that there does not exist the at least predetermined number of identical edge angles from among the obtained edge angles.

5. The method as claimed in claim 1, wherein the neighboring regions comprise a top neighboring region of the detected block, a bottom neighboring region of the detected block, a left neighboring region of the detected block, and a right neighboring region of the detected block.

6. The method as claimed in claim 1, wherein the separate obtaining of the edge angles comprises separately obtaining the edge angle for each of the neighboring regions by using a Sobel filter or a Prewitt filter.

7. The method as claimed in claim 1, wherein the restoring further comprises:
   performing an interpolation method, different from the directional interpolation, if determined that there does not exist the at least predetermined number of identical edge angles from among the obtained edge angles.

8. The method as claimed in claim 1, wherein the determining of whether the at least predetermined number of edge angles from among the obtained edge angles are identical comprises:
   quantizing the obtained edge angles by comparing values of the obtained edge angles to a predetermined set of angle values; and comparing the quantized edge angles.

9. An apparatus for error concealment in image data, the apparatus comprising:
   an error detection unit to detect a block having an error from a current picture in the image data;
   an edge detection unit to divide a region that surrounds the detected block into a plurality of neighboring regions and to separately obtain an edge angle for each of the neighboring regions; and
   an error concealment unit to restore the detected block by selectively performing directional interpolation in a direction of the obtained edge angles,
   wherein the error concealment unit comprises a determination unit to determine whether at least a predetermined number of edge angles from among the obtained edge angles are identical and an interpolation unit to perform the directional interpolation if the at least predetermined number of edge angles are identical.

10. The apparatus as claimed in claim 9, wherein the predetermined number is two.

11. The apparatus as claimed in claim 9, wherein the interpolation unit performs the directional interpolation by using the identical edge angles.

12. The apparatus as claimed in claim 9, wherein, if determined that there does not exist the at least predetermined number of identical edge angles from among the obtained edge angles, the interpolation unit performs bilinear interpolation.

13. The apparatus as claimed in claim 9, wherein the neighboring regions comprise a top neighboring region of the detected block, a bottom neighboring region of the detected block, a left neighboring region of the detected block, and a right neighboring region of the detected block.

14. The apparatus as claimed in claim 9, wherein the edge detection unit separately obtains the edge angles for each of the neighboring regions by using a Sobel filter or a Prewitt filter.

15. The apparatus as claimed in claim 9, wherein if it is determined that there does not exist the at least predetermined number of identical edge angles from among the obtained edge angles, the interpolation unit performs an interpolation method different from the directional interpolation.

16. The apparatus as claimed in claim 9, wherein the determination unit quantizes the obtained edge angles by comparing values of the obtained edge angles to a predetermined set of angle values, and compares the quantized edge angles to determine whether at least a predetermined number of edge angles from among the obtained edge angles are identical.

17. An apparatus for error concealment in image data including a block having an error, the apparatus comprising:
   an edge detection unit to divide a region that surrounds the block having the error into a plurality of neighboring regions and to separately obtain an edge angle for each of the neighboring regions; and
   an error concealment unit to restore the block having the error by selectively performing directional interpolation in a direction of the obtained edge angles,
   wherein the error concealment unit comprises a determination unit to determine whether at least a predetermined number of edge angles from among the obtained edge angles are identical and an interpolation unit to perform the directional interpolation if the at least predetermined number of edge angles are identical.

18. The apparatus as claimed in claim 17, wherein, if it is determined that there does not exist the at least predetermined number of identical edge angles from among the obtained edge angles, the interpolation unit performs an interpolation method different from the directional interpolation.

19. A method of error concealment in image data including a block having an error, the method comprising:
   dividing a region that surrounds the block having the error into a plurality of neighboring regions;
   separately obtaining an edge angle for each of the neighboring regions; and
   restoring the block having the error by selectively performing directional interpolation in a direction of the obtained edge angles,
   wherein the restoring comprises determining whether at least a predetermined number of edge angles from among the obtained edge angles are identical and performing the directional interpolation if the at least predetermined number of edge angles are identical.

20. The method as claimed in claim 19, wherein the restoring further comprises:
   performing an interpolation method, different from the directional interpolation, if it is determined that there does not exist the at least predetermined number of identical edge angles from among the obtained edge angles.

21. A non-transitory computer readable recording medium implemented by a computer and having recorded thereon a computer program for executing the method of claim 1.

* * * * *